(12) United States Patent
Sanders (10) Patent No.: US 7,299,614 B2
(45) Date of Patent: Nov. 27, 2007

(54) COLLAPSIBLE RAKE

(76) Inventor: James Sanders, 20 W. 200 North, Washington City, UT (US) 84780

( * ) Notice: Subject to any disclaimer, the term of this patent is extended or adjusted under 35 U.S.C. 154(b) by 118 days.

(21) Appl. No.: 11/047,837

(22) Filed: Jan. 31, 2005

(65) Prior Publication Data

US 2006/0168935 A1 Aug. 3, 2006

(51) Int. Cl.
*A01D 7/00* (2006.01)
(52) U.S. Cl. .............................. 56/400.01; 56/400.04; 56/400.16; 56/400.17; 56/400.18; 56/400.19; 56/400.2; 56/400.21
(58) Field of Classification Search ............ 56/400.01, 56/400.16, 400.18, 400.19, 400.2, 400.21, 56/DIG. 18, DIG. 21; D8/6–10, 13; 15/143.1, 15/144.1, 144.2, 144.3, 144.4
See application file for complete search history.

(56) References Cited

U.S. PATENT DOCUMENTS

| | | | | |
|---|---|---|---|---|
| 2,110,538 A | * | 3/1938 | Walsh | 56/400.19 |
| 2,724,610 A | * | 11/1955 | Fitzgerald | 294/55.5 |
| 3,727,389 A | | 4/1973 | Huspen | |
| 4,054,313 A | * | 10/1977 | Ciuci | 294/53.5 |
| 4,086,750 A | | 5/1978 | White | |
| 4,214,538 A | * | 7/1980 | Druskin et al. | 111/95 |
| 4,236,742 A | | 12/1980 | Florence | |
| 4,843,667 A | | 7/1989 | Hanly, Sr. | |
| 4,848,073 A | | 7/1989 | Germain et al. | |
| 5,185,992 A | * | 2/1993 | Garcia | 56/400.04 |
| 5,311,733 A | * | 5/1994 | Krenkel | 56/400.06 |
| 5,414,982 A | | 5/1995 | Darnell | |
| 5,440,868 A | | 8/1995 | Darnell | |
| 5,495,670 A | * | 3/1996 | Quinn | 30/162 |
| 5,609,215 A | * | 3/1997 | Rios et al. | 172/373 |
| 5,720,159 A | | 2/1998 | Dee | |
| 5,758,915 A | * | 6/1998 | Quinn et al. | 294/19.2 |
| 6,101,799 A | | 8/2000 | Darnell | |
| 6,370,857 B1 | | 4/2002 | Mitchell | |
| 6,408,606 B1 | | 6/2002 | Hsu | |
| 2004/0088962 A1 | | 5/2004 | Ki-Bok | |

* cited by examiner

*Primary Examiner*—Thomas B. Will
*Assistant Examiner*—Jamie L McGowan
(74) *Attorney, Agent, or Firm*—Advantia Law Group; Michael W. Starkweather; Jason P. Webb (57) ABSTRACT

A novel rake minimally consists of: at least two tine frames, each tine frame having a plurality of tines coupled thereto; a tine frame coupling for coupling to proximal ends of each of the tine frames; pivot mechanisms coupled between the tine frames and the tine frame coupling; a rake handle coupled at a proximal end to the tine frame coupling, and adapted for being grasped at a distal end for raking activity; and a locking mechanism adapted to lock the tine frames into an operational raking configuration, and adapted to unlock the tine frames for transition to a non-raking stowage configuration. When the tine frames are unlocked, the tine frames are adapted to have their distal ends pivoted toward the distal end of the rake handle into the stowage configuration with the distal ends of the tine frames being at least in close proximity of the rake handle.

16 Claims, 10 Drawing Sheets

COLLAPSIBLE RAKE

1. FIELD OF THE INVENTION

The present invention generally relates to rakes and other manual implements used to comb land to gather material, or for loosening or smoothing land. More particularly, the present invention relates to improving the stowability and portability of rakes and similar implements which are suitable for use during camping activities.

2. BACKGROUND OF RELATED ART

Rakes and other similar implements used for lawn and land management activities, while often simple to operate, reliable, and reasonably inexpensive, are often more bulky than desirable. For example, in order to be durable, reliable, and practical, rake handles are typically too long to be stored in small spaces such as backpacks and luggage. As a result, rakes are not easily carried on hiking and camping excursions where they might be needed a considerable distance from the automobile which has transported them.

Not only is a conventional handle an impediment to portability and stowability or storability in small spaces such backpacks, but the frames to which the prongs or tines are attached are also too large to be conveniently carried in small spaces.

Several prior art approaches have addressed the desire to make lawn or camp rakes collapsible in some manner-all with noticeable drawbacks. For example, some prior art rakes have tines which are "fanned out" or spread like a hand fan into a predetermined position for raking activities, and "fanned in" when the rake is to be stored. Once "fanned in," the tines are typically retracted into the interior of a hollow rake handle. As a result, the minimum practical handle length needed to accept the tines and the additional length often needed to accommodate rods or other mechanisms, make these rakes too long for small space storage-even when the handles are collapsible. Such rakes are often complex and expensive. Examples of the aforementioned approach appear in the following U.S. Pat. Nos.: 5,720,159; 5,414,982; 4,843,667; 4,236,742; 4,086,750; 3,750,379 and 3,727,389.

Other approaches separate the tines into two sections, and then axially rotate the tines around the handle centerline to place the rakes into a storage configuration. This provides not only a large height (measured from the tip of the tines to the end of the handle), but also leaves a large projected side area. Typical of this approach are U.S. Pat. Nos. 6,370,857, 6,101,799 and 5,440,868.

Yet other approaches are also inadequate, including those disclosed by the U.S. Pat. Nos. 6,408,606, 5,598,691, 4,848, 073, and U.S. patent application Ser. No. 2004/0088962.

What is therefore needed but absent in the prior art, is a rake with conventional sized tines, tine frames (to which the tines are attached) and handle, which rake is collapsible to a small enough height and side projection to be accommodated by the likes of a backpack.

SUMMARY

In view of the above-identified limitations of the prior art, the present invention provides a rake that at least including: at least two tine frames, each tine frame having a plurality of tines coupled thereto; a tine frame coupling for coupling to proximal ends of each of the tine frames; pivot mechanisms coupled between the tine frames and the tine frame coupling; a rake handle coupled at a proximal end to the tine frame coupling, and adapted for being grasped at a distal end for raking activity; and a locking mechanism adapted to lock the tine frames into an operational raking configuration, and adapted to unlock the tine frames for transition to a non-raking stowage configuration; wherein when the tine frames are unlocked, the tine frames are adapted to have their distal ends pivoted toward the distal end of the rake handle into the stowage configuration with the distal ends of the tine frames being at least in close proximity of the rake handle.

BRIEF DESCRIPTION OF THE DRAWINGS

Features of the present invention will become apparent to those skilled in the art from the following description with reference to the drawings, in which.

DETAILED DESCRIPTION

Figure 1:
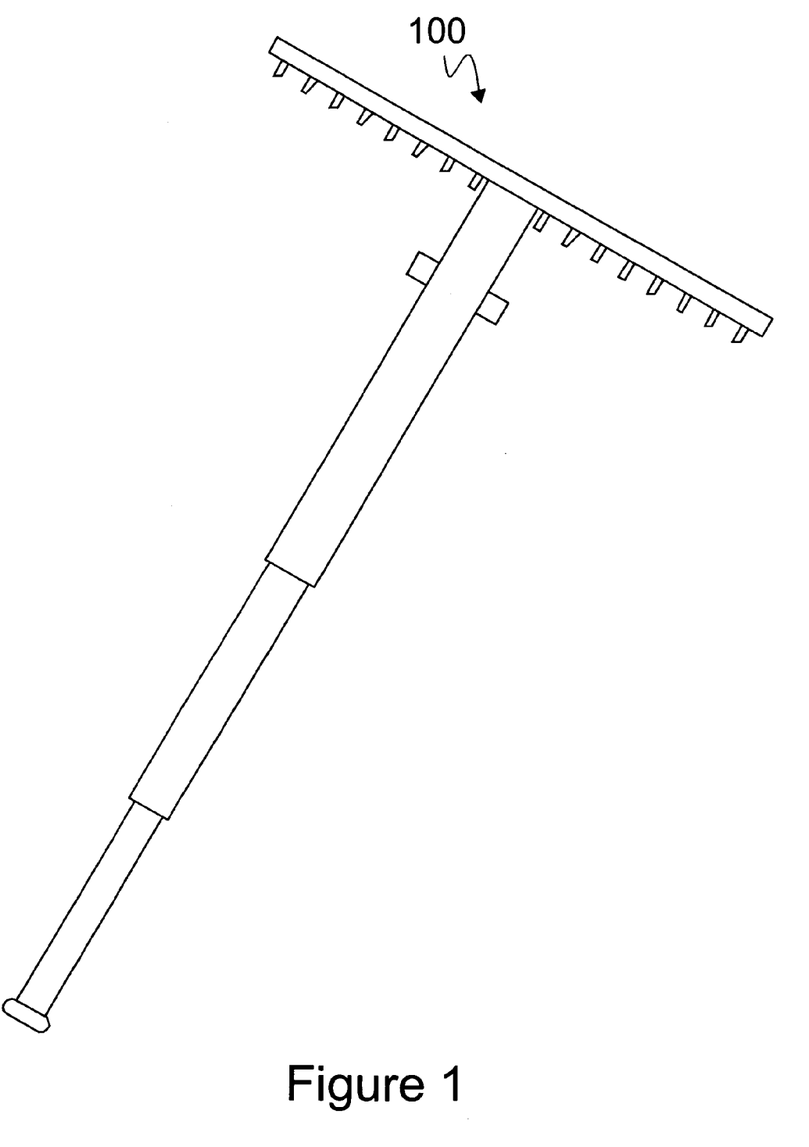
FIG. 1 is a plan view of a preferred embodiment of the present-inventive rake.

A view of a preferred embodiment of the present-inventive rake 100 is shown in FIG. 1. In general, the present-inventive rake 100 is full size in the raking configuration illustrated. Used below, the term "raking configuration" means a configuration of the rake that allows a user to engage in raking and similar activities. "Stowage configuration" and "storage configuration" refer to configurations of the rake where components are retracted, allowing for easier stowage, storage or transportation.

The tines and the frames to which they are attached are locked into position for raking, and unlocked for storage by pressing a tab and pulling the tine frames away from the rake handle, as will be explained infra. The rake handle is collapsible—in this case telescopic—to reduce the height of the rake for storage.

Figure 2:
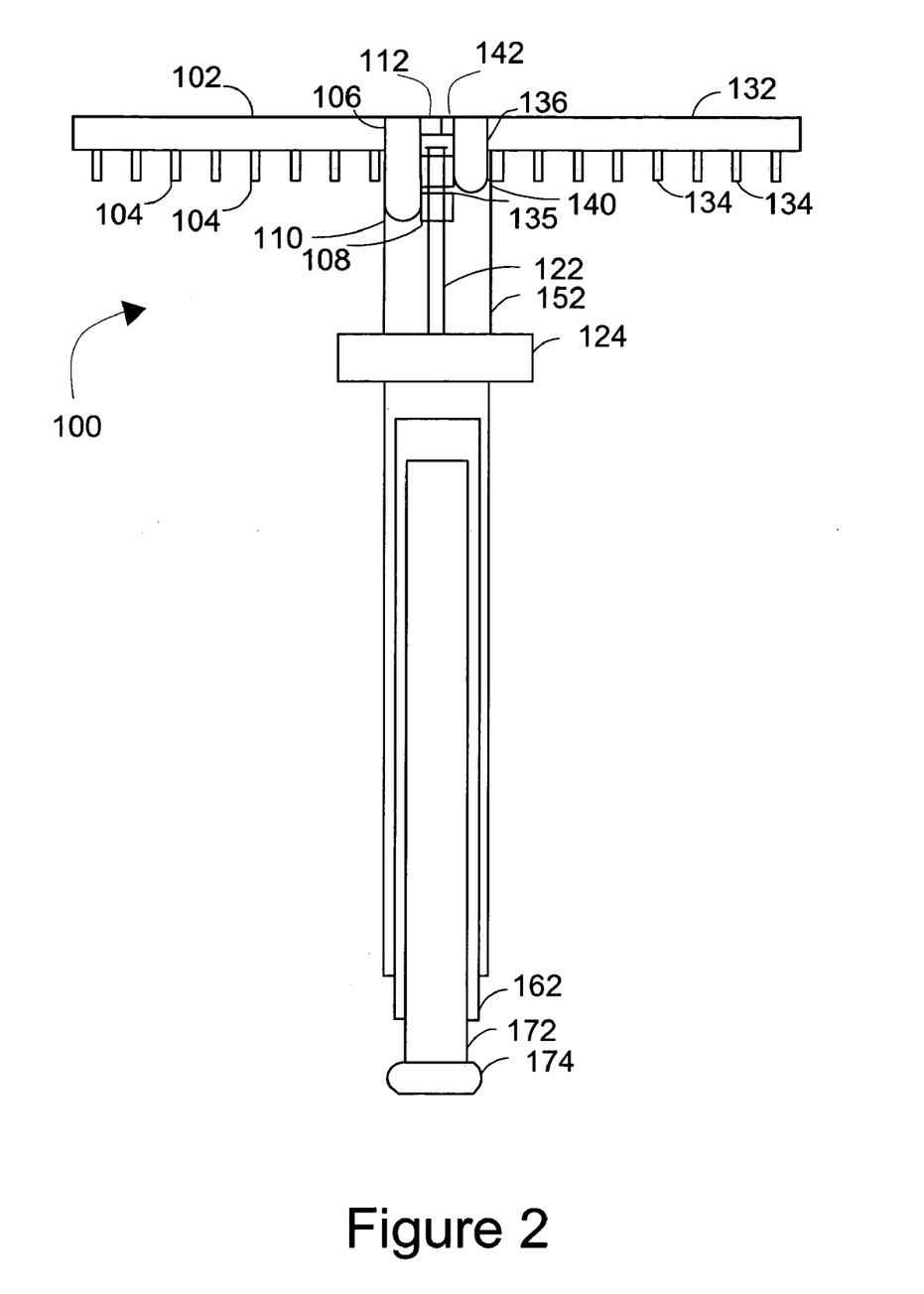
FIG. 2 is a cutaway plan view (not drawn to scale) of the rake in FIG. 1, with the tines and tine frames in the raking configuration, and the handle retracted for illustration convenience.
Figure 3:
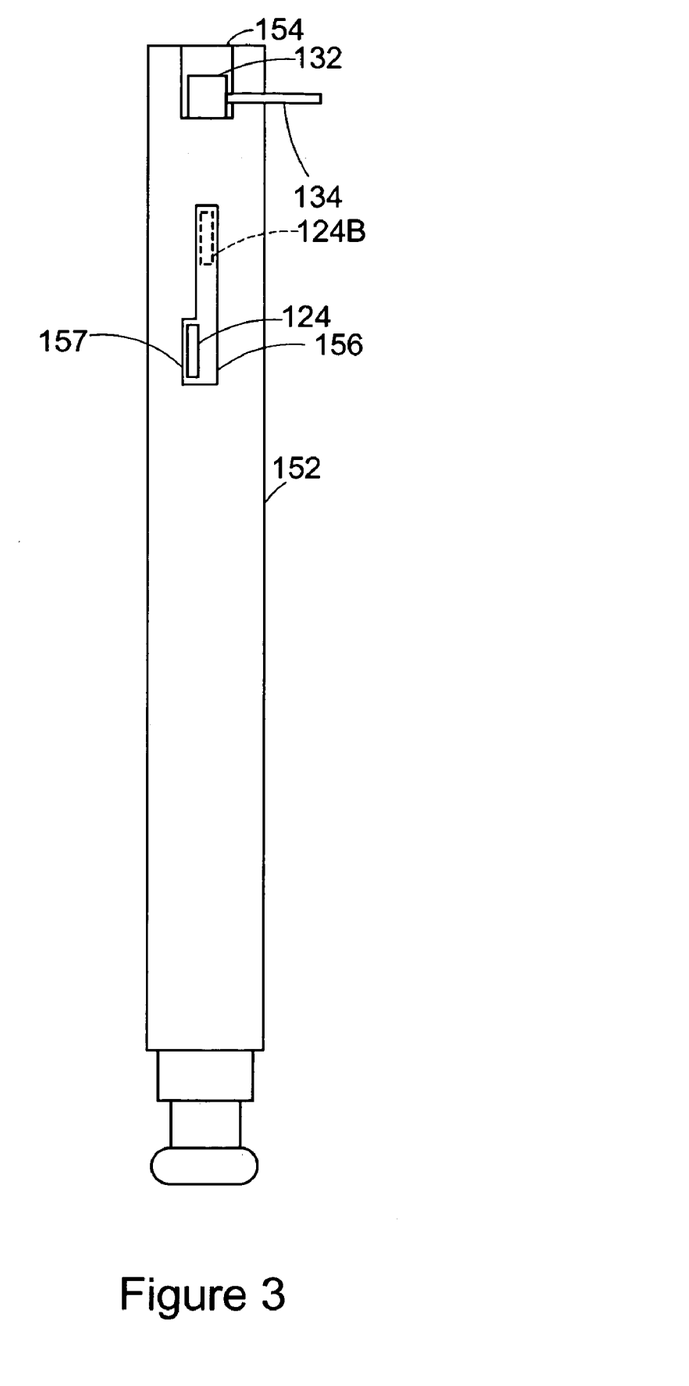
FIG. 3 is a version of FIG. 2, axially rotated 90 degrees.

Turning to the cutaway view of FIG. 2, and the plan view of FIG. 3 (which shows the rake 100 axially rotated 90 degrees with respect to the illustration in FIG. 1), the rake 100 is shown with its tine frames 102 and 132 (to which the tines 104 and 134, respectively, are attached) fully extended into a configuration used for raking activities. For convenience of illustration, the handle 152 (with telescopic elements 162, 172, and knob 174) is shown in the collapsed position. Those skilled in the art to which the present invention pertains will understand that when the rake is in the raking mode or raking configuration, the handle elements are fully extended axially.

The tine frames 102 and 132 include pivot mechanisms 106 and 136 which allow the tine frames to be rotated with respect to the portions of the frames which can fit inside of the hollow (or at least hollow at the proximal end) rake handle 152. The proximal ends of the tine frames are coupled to yet additional pivot mechanisms 110 and 140 to allow rotation of the tine frames in different plane from those associated with the pivot mechanisms 106 and 136. The tine frame pivot mechanisms 110 and 140 are connected to tine frame couplers 108 and 135, which are sleeves that rotate about a rod 122. The sleeves are fixed at their axial positions along the rod 122.

A locking tab 124 connected to the rod 122 protrudes from a pair of locking tab slots 156 on opposite sides of the rake handle 152. The centerline offset of the locking tab 124 causes the locking tab to be biased in favor of pushing away from the centerline of the locking tab slots 156 until the locking tab reaches locking tab stops 157 when the tine frames, rod and locking tab are pushed toward the distal end of the rake handle to lock the tine frames into the raking configuration. That is, when the locking tab reaches the locking tab stop, it springs outward to lock the axial position of the rod and tine frames with respect to rake handle.

When locked in the raking configuration, the frames 102 and 132 fit into tine frame slots 154 located on opposite sides of the rake handle 152. The combination of the locking tab 124, locking tab slots 156, and tine frame slots 154 cooperates to restrict the axial and longitudinal movement of the tine frames when the rake 100 is in the raking configuration.

Figure 5:
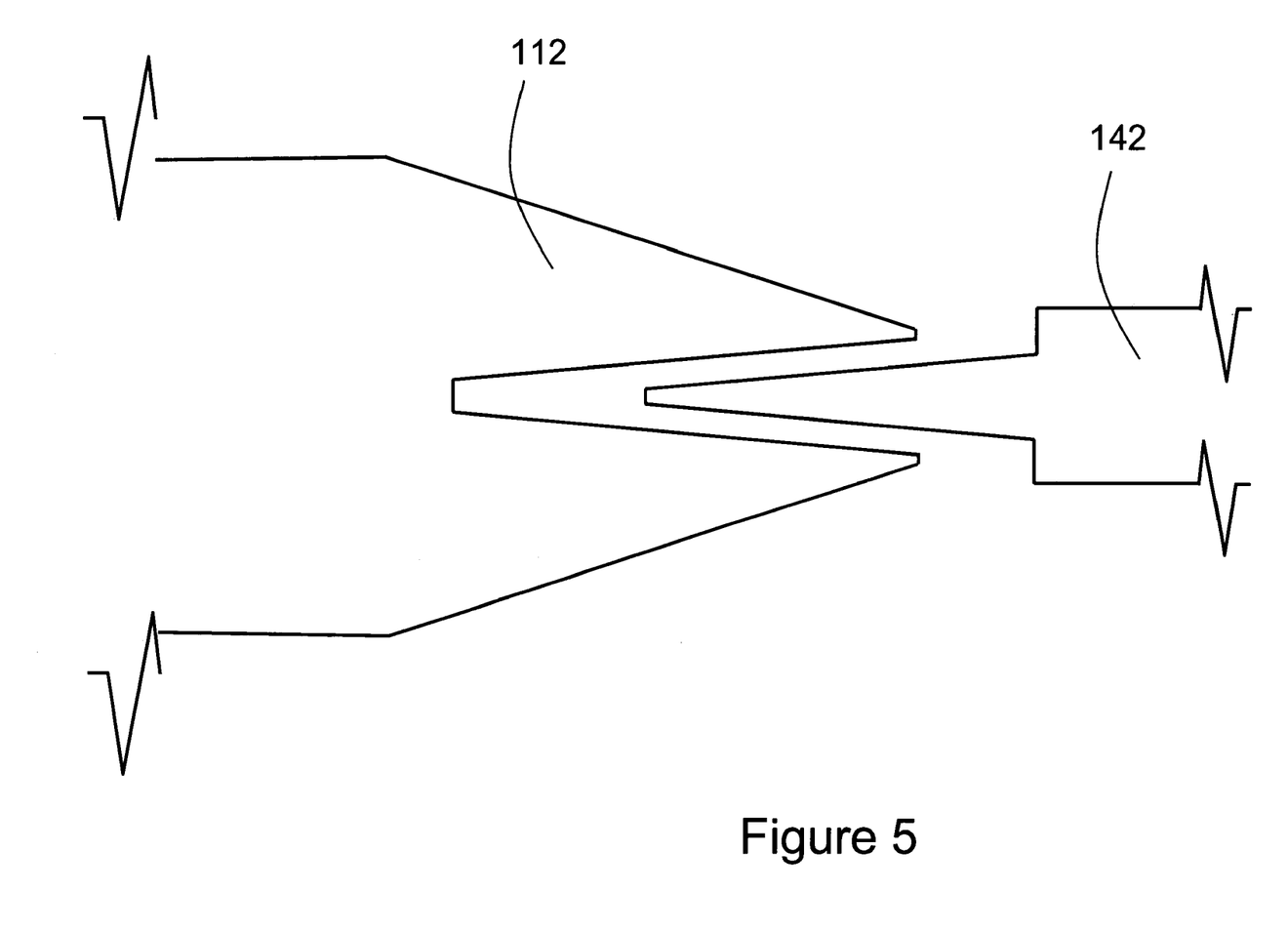
FIG. 5 is a front view of tine frame limiters which cooperate as a locking mechanism in the present-inventive rake.

The tine frames 102 and 132 also include limiters 112 and 142 to prevent the tine frames from traveling beyond predetermined positions when the rake is in the raking configuration. As shown in FIG. 5, the limiters 112 and 142 also engage and serve as a locking mechanism to keep the tine frames from folding when the rake is in the operational position. While the limiters 112 and 142 form an interference fit when engaged, according to the preferred embodiment, they may also lock by snapping into place in an alternate embodiment. The pivot mechanisms 106 and 136 also have limiters in the preferred embodiment to prevent the tines from rotating beyond a useful position in response to torsion and transverse forces on the tine frames during raking activities.

Figure 6:
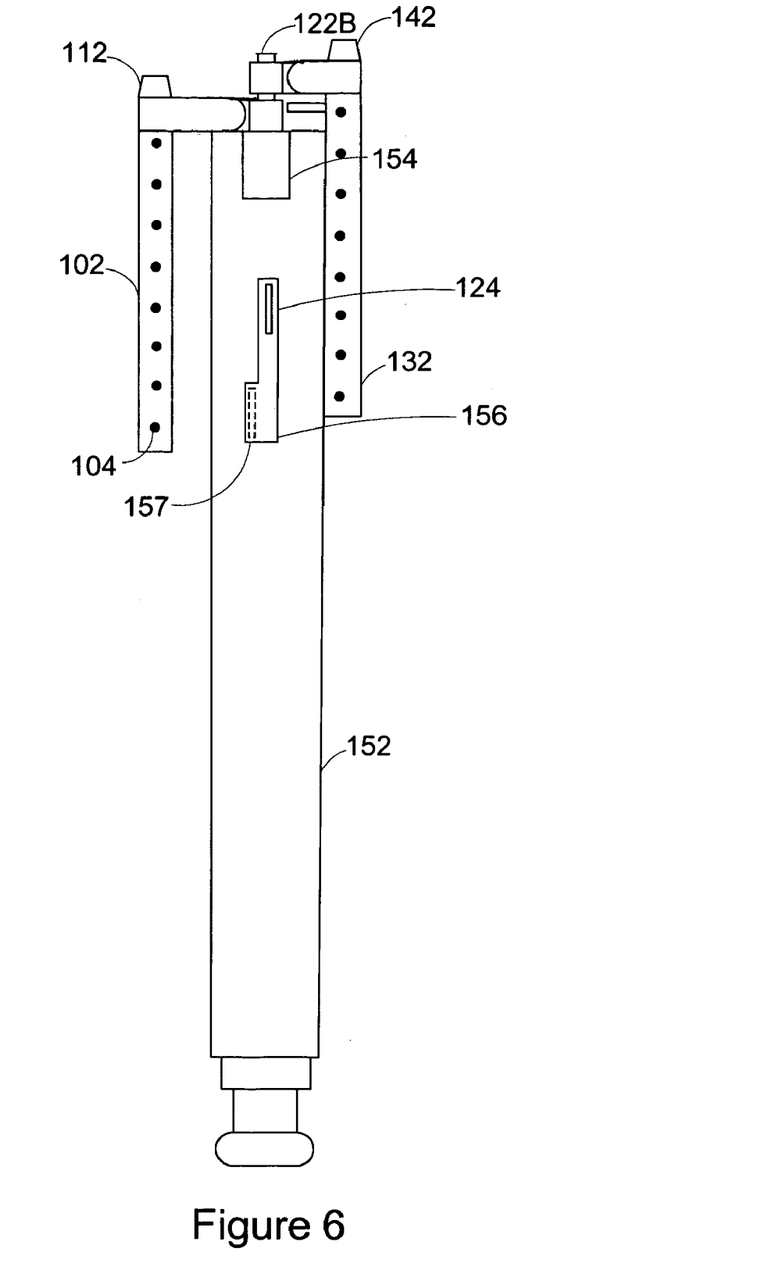
FIG. 6 is a view (not drawn to scale) of the rake in FIG. 1, with the tines and tine frames in the storage/stowage configuration.
Figure 7:
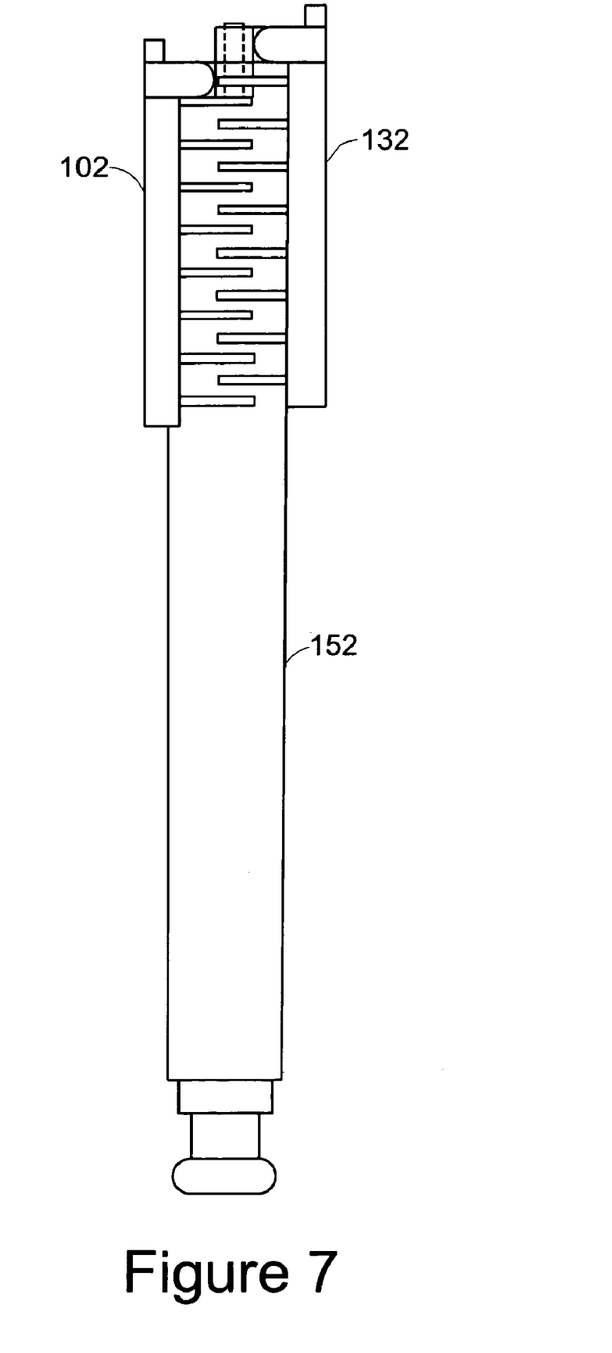
FIG. 7 is a version of the rake in FIG. 6, showing the tines resting next to the rake handle.

The storage or stowage configuration of the rake 100 is shown in FIGS. 6-7. A cap piece 122B (not previously shown) acts as a retainer to prevent the tine frame couplers 108 and 135 from separating from the rod 122. To transition from the raking configuration to the storage configuration, the user disengages the locking tab 124 from locking tab stops 157 and moves the rake handle away from the tine frames. When the tine frames protrude from the proximal end of the rake handle 152 and are free of the tine frame slots 154, the locking tab is in the position numbered 124B, and the tine frames are then rotated approximately 90 degrees about the rake handle centerline. Next, the tine frames are pivoted towards the distal end of the rake handle until they come to rest next to the rake handle as shown in FIG. 6.

In the stowage/storage configuration, the tine frames are in the lowered positions shown (in FIGS. 6-7), and the rake handle is collapsed. As result, the height and lateral projection of the rake 100 are greatly reduced to allow stowage in a space such as that enclosed by a backpack.

The stowage/storage configuration of FIG. 6 can be further modified by axially rotating the tine frames 102 and 132 toward each other until the tines come to rest along one side of the rake handle 152, and are partially meshed as shown.

Figure 4:
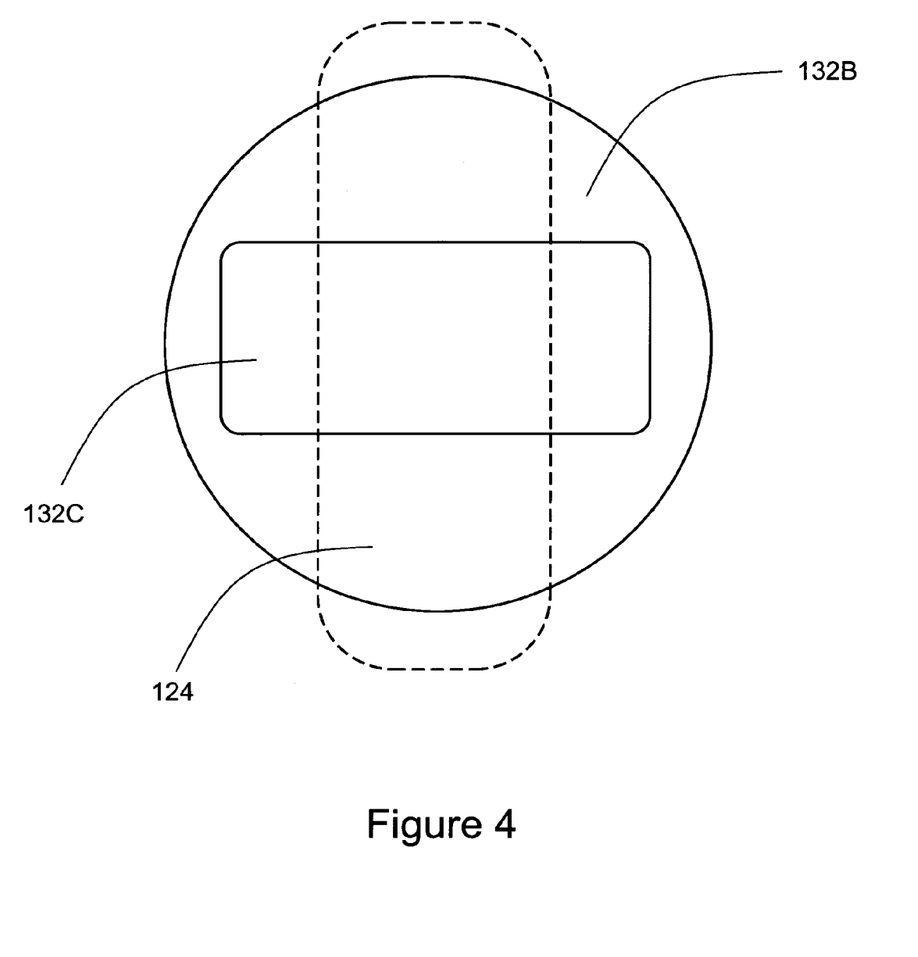
FIG. 4 is a front view of a rake head retainer used in an alternate embodiment of the present-inventive rake.

In the preferred embodiment, the tine frames 102 and 132 are locked into the raking position when they are inserted into the tine frame slots 154. As an alternative to employing tine frame slots, the present-inventive rake can instead included rake head retainer 132B (See FIG. 4) at the distal end of the rake handle. A slot 132C accepts the portions 106 and 136 of the tine frames to lock them into the raking position when the locking tab 124 is engaged with the locking tab stop 157. The tine frames disengage with the slot 132C when the locking tab 124 and the rod are moved as describe supra, to transition the tine frames to the stowage/storage position.

Figure 10:
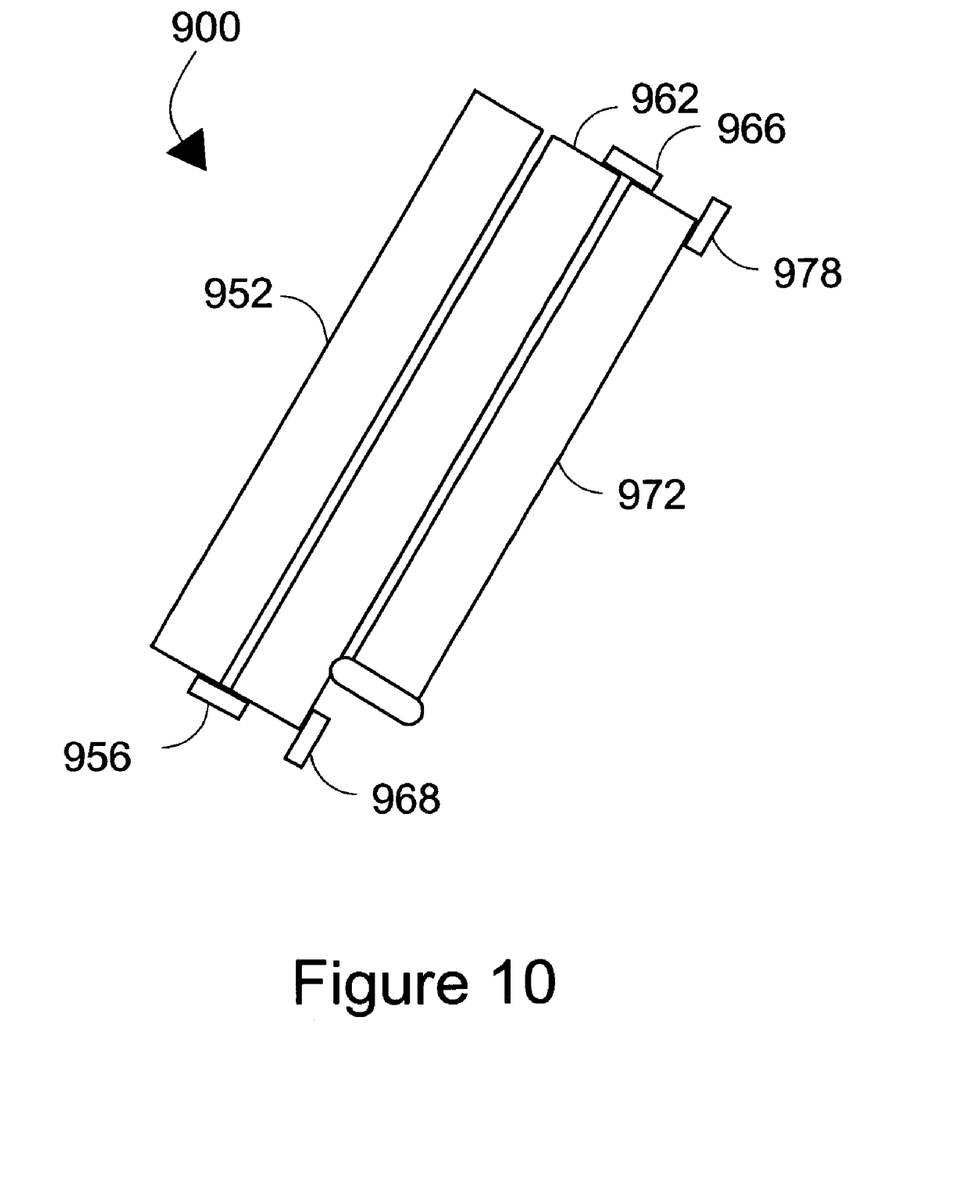
FIG. 10, is a plan view of an alternate embodiment for a collapsible rake handle suitable for use with the present inventive rake.

Those skilled in the art to which the present invention pertains will appreciate, given the above teachings, that the handle can be collapsed using different approaches. For example, rather than a telescopic embodiment, the embodiment illustrated in FIG. 10 shows a rake handle 900 with multiple sections 952, 962 and 972. The sections are connected by hinges 956 and 966. Further, the sections may be locked into place to form a conventional size handle via latches 968 and 978. The latches 968 and 978 also allow a fully expanded handle to be unlocked and folded into the sections 952, 962 and 972 when the rake is in the storage/stowage configuration.

Figure 8:
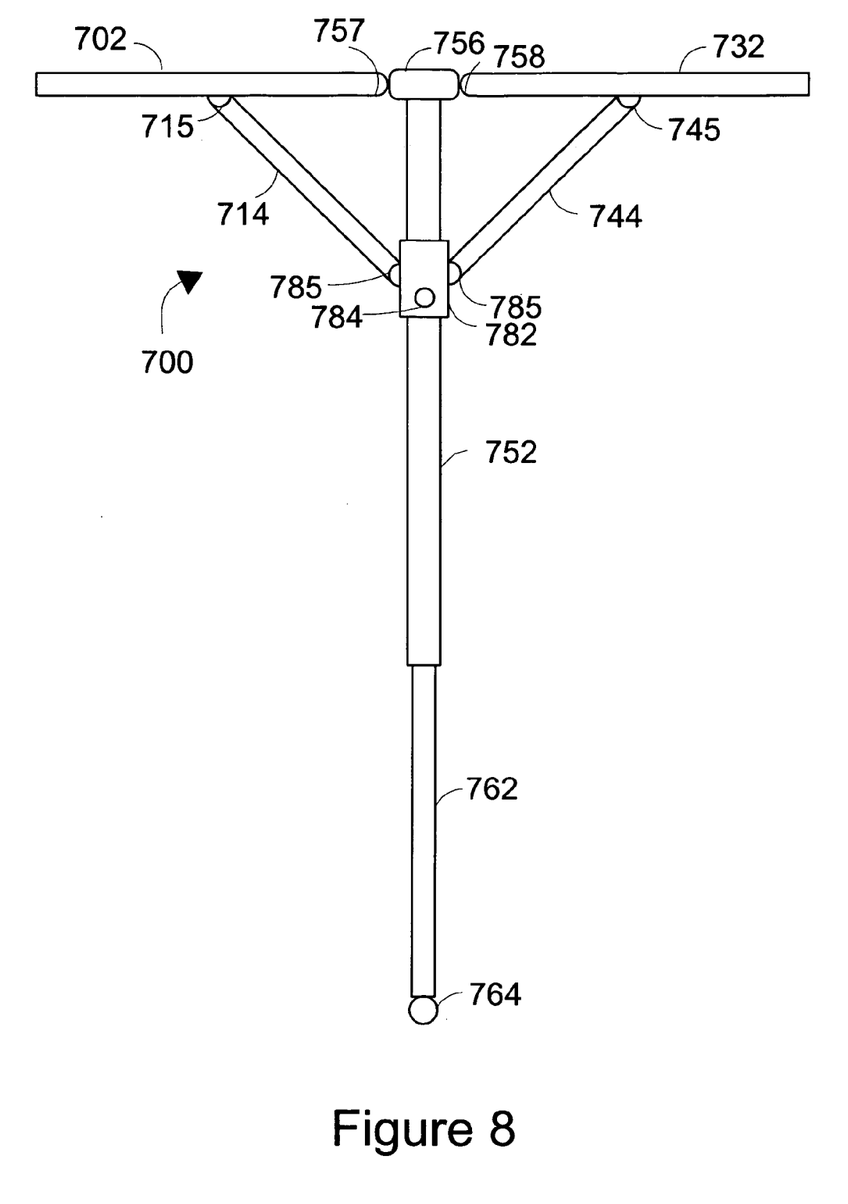
FIG. 8 is a plan view of an alternate embodiment of the present-inventive rake with the tines and tine frames in the raking configuration.
Figure 9:
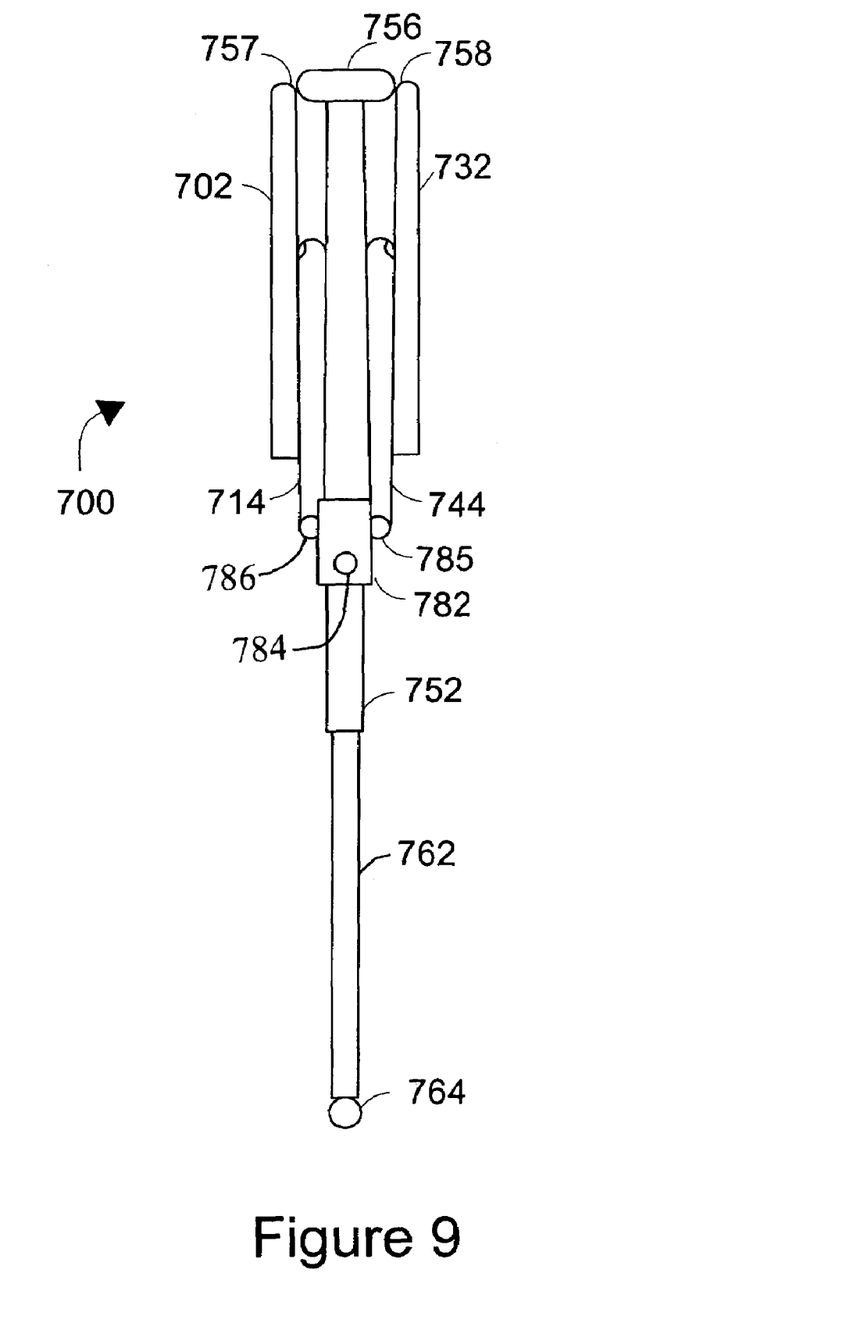
FIG. 9 is a plan view of an alternate embodiment of the present-inventive rake, with the tines and tine frames in the storage/stowage configuration.

An alternate embodiment 700 of the present invention is illustrated in FIGS. 8 and 9, with FIG. 8 illustrating the raking configuration, and FIG. 9 illustrating the retracted/storage configuration. Two tine frames 702 and 732 are joined to a tine frame coupler 756 via pivot mechanisms 757 and 758. The tine frame coupler 756 is connected to the proximal end of a rake handle 752. The rake handle contains one or more sections 762 which are collapsible for storage, and a handle end 764 which provides a convenient grasping place allowing a user to expand or retract the handle sections as needed.

The tine frames 702 and 732 are connected to tine frame strut members 714 and 744, respectively via pivots 715 and 745, respectively. The tine frame strut members and connected via pivots 785 and 786 to a locking mechanism 782. The locking mechanism 782 is adapted to bind with the rake handle 752 at a predetermined position along the length of the handle. The aforementioned predetermined position corresponds to the raking configuration of the rake 700. To collapse the rake 700 as shown in FIG. 9, the user presses a release button 784 on the locking mechanism 782 to unbind the locking mechanism from handle. The locking mechanism is then moved toward the distal end of the rake handle, and pulls the struts—and ultimately the tine frames—up toward the handle until the tine frames reach their storage position as shown in FIG. 9.

It is envisioned that in one embodiment of the invention, there may be a cover, or sheath, encompassing a portion of the rake. The sheath may encompass the entire rake. The sheath may encompass only a portion, in particular, the portion of the rake comprising the rake head. The sheath may be configured to protect the rake in its storage configuration and to shield the rake from contact with outside objects, thereby protecting the rake as well as the outside objects. The sheath may be made of various materials, including but not limited to canvas, cloth, plastics, and woven or interlinked materials.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A rake comprising:
   at least two tine flames, each tine frame having a plurality of tines coupled thereto;
   a tine frame coupling for coupling to proximal ends of each of the tine frames;
   pivot mechanisms coupled between said tine frames and said tine frame coupling;
   a rake handle coupled at a proximal end to said tine frame coupling, and adapted for being grasped at a distal end for raking activity, the rake handle including at least one locking tab slot; and
   a locking mechanism adapted to lock said tine frames into an operational rake configuration, and adapted to unlock said tine frames for transition to said non-raking stowage configuration, the locking mechanism including: a locking tab coupled to said tine frame coupling, and positioned within said rake handle, wherein at least a portion of said locking tab externally protrudes said rake handle through said locking tab slot, and wherein said tab is adapted to lock said frame tines into said raking configuration when engaged with a stop of said locking tab slot, and said locking tab is adapted to be pressed to release said tine frames to transition said rake to said stowage configuration, wherein said tine frame slots are substantially axially aligned with said locking tab slots;
   wherein when said tine frames are unlocked, said tine frames are adapted to have their distal ends pivoted toward the distal end of said rake handle into said stowage configuration with the distal ends of the tine frames being at least in close proximity of said rake handle;
   wherein in said stowage configuration, said plurality of tines are pivoted toward the distal end of said rack handle and said plurality of tines are meshed; and
   wherein said rake handle is collapsible.

2. The rake of claim 1, wherein said rake handle further comprises
   a plurality of telescopic sections.

3. The rake of claim 1, wherein said rake handle further comprises a plurality of foldable handle sections.

4. The rake of claim 1, wherein said pivot mechanisms operate with at least two degrees of freedom.

5. The rake of claim 1, wherein said locking mechanism further comprises on said rake handle at its proximal end, and for each said tine rake, a tine frame slot for receiving and engaging a tine frame near the proximal ends of said tine frames to lock said tine frames into said raking configuration, wherein said tine frames further comprise pivot limiters to limit said tine frames to a predetermined position during locking in the raking configuration; and said locking mechanism is adapted to be disengaged from and unlock said tine frames to allow movement to said stowage configuration when desired.

6. The rake of claim 1, wherein said locking tab is biased toward said locking tab slot stop.

7. The rake of claim 1, wherein said locking tab is pivotally coupled to said tine frame coupler.

8. The rake of claim 1, wherein to transition between said raking position and said stowage configuration, said tine frames are adapted to be rotated relative to said locking tab slots when said tine frames are unlocked, and said tine frames are adapted to be pivoted toward the distal end of said rake handle.

9. The rake of claim 1, wherein the fan-out travel of said tine frames in said raking configuration is limited by interfering contact between the proximal ends of said tine frames.

10. The rake of claim 1, further comprising:
    a tine frame strut pivotally coupled between each line frame and said locking mechanism;
    wherein said locking mechanism is slidably mounted around said rake handle to bind with said rake handle to lock said tine frames into said raking configuration, and said locking mechanism is adapted to release the bind and be slid in the rake handle distal direction to pull the tine frames via said tine frame struts toward said rake handle to achieve said stowage configuration.

11. The rake of claim 10, wherein said rake handle further comprises a plurality of telescopic sections.

12. The rake of claim 10, wherein said rake handle further comprises a plurality of foldable handle sections.

13. The rake of claim 10, further comprising a sheath configured to shield a portion of the rake while in the stowage configuration.

14. A rake comprising:
    at least two tine frames, each tine frame having a plurality of tines coupled thereto;
    a tine frame coupling for coupling to proximal ends of each of the tine frames;
    pivot mechanisms coupled between said tine frames and said tine frame coupling;
      a rake handle coupled at a proximal end to said tine frame coupling, and adapted for being grasped at a distal end for raking activity, the rake handle including at least one locking tab slot; and
    a locking mechanism adapted to lock said tine frames into an operational rake configuration, and adapted to unlock said tine frames for transition to said non-raking stowage configuration, the locking mechanism including a locking tab coupled to said tine frame coupling, and positioned within said rake handle, wherein at least a portion of said locking tab externally protrudes said rake handle through said locking tab slot, and wherein said tab is adapted to lock said frame tines into said raking configuration when engaged with a stop of said locking tab slot and said locking tab is adapted to be pressed to release said tine frames to transition said rake to said stowage configuration;
    wherein to transition between said raking position and said stowage configuration, said tine frames are adapted to be rotated relative to said locking tab slots when said tine frames are unlocked, and said tine frames are adapted to be pivoted toward the distal end of said rake handle;
    wherein when said tine frames are unlocked, said tine frames are adapted to have their distal ends pivoted toward the distal end of said rake handle into said stowage configuration with the distal ends of the tine frames being at least in close proximity of said rake handle;
    wherein in said stowage configuration, said plurality of tines are pivoted toward the distal end of said rake handle and said plurality of tines are meshed; and
    wherein said rake handle is collapsible.

15. A rake comprising:
    at least two tine frames, each tine frame having a plurality of tines coupled thereto;

a tine frame coupling for coupling to proximal ends of each of the tine frames;

pivot mechanisms coupled between said tine frames and said tine frame coupling;

a rake handle coupled at a proximal end to said tine frame coupling, and adapted for being grasped at a distal end for raking activity, the rake handle including at least one locking tab slot; and a locking mechanism adapted to lock said tine frames into an operational rake configuration, and adapted to unlock said tine frames for transition to said non-raking stowage configuration, the locking mechanism including a locking tab coupled to said tine frame coupling, and positioned within said rake handle, wherein at least a portion of said locking tab externally protrudes said rake handle through said locking tab slot, and wherein said tab is adapted to lock said frame tines into said raking configuration when engaged with a stop of said locking tab slot and said locking tab is adapted to be pressed to release said tine frames to transition said rake to said stowage configuration, wherein said tine slots are substantially axially aligned with said locking tab slots;

wherein to transition between said raking position and said stowage configuration, said tine frames are adapted to be rotated relative to said locking tab slots when said tine frames are unlocked, and said tine frames are adapted to be pivoted toward the distal end of said rake handle;

wherein when said tine frames are unlocked, said tine frames are adapted to have their distal ends pivoted toward the distal end of said rake handle into said stowage configuration with the distal ends of the tine frames being at least in close proximity of said rake handle;

wherein in said stowage configuration, said plurality of tines are pivoted toward the distal end of said rake handle and said plurality of tines are meshed; and wherein said rake handle is collapsible.

16. The rake of claim 15, wherein said pivot mechanisms operate with at least two degrees of freedom.

* * * * *